US009792566B2

(12) United States Patent
Vierich

(10) Patent No.: US 9,792,566 B2
(45) Date of Patent: Oct. 17, 2017

(54) MODELING HIERARCHICAL INFORMATION FROM A DATA SOURCE

(71) Applicant: International Business Machines Corporation, Armonk, NY (US)

(72) Inventor: Ralf Vierich, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 997 days.

(21) Appl. No.: 13/958,426

(22) Filed: Aug. 2, 2013

(65) Prior Publication Data

US 2015/0040049 A1   Feb. 5, 2015

(51) Int. Cl.
*G06F 17/30* (2006.01)
*G06Q 10/06* (2012.01)

(52) U.S. Cl.
CPC ..... *G06Q 10/063* (2013.01); *G06F 17/30539* (2013.01); *G06F 17/30592* (2013.01)

(58) Field of Classification Search
None
See application file for complete search history.

(56) References Cited

U.S. PATENT DOCUMENTS

| | | | | |
|---|---|---|---|---|
| 5,787,411 A | * | 7/1998 | Groff | G06F 17/30398 |
| 7,840,600 B1 | * | 11/2010 | Bhatia | G06F 17/30398 |
| | | | | 707/783 |
| 8,150,832 B2 | | 4/2012 | Helfman | |
| 8,204,880 B2 | | 6/2012 | Vignet | |
| 2007/0112724 A1 | | 5/2007 | Beach et al. | |
| 2009/0132560 A1 | | 5/2009 | Vignet | |
| 2010/0275149 A1 | * | 10/2010 | Vuong | G06F 17/212 |
| | | | | 715/780 |
| 2011/0106791 A1 | * | 5/2011 | Maim | G06F 17/246 |
| | | | | 707/722 |
| 2014/0157100 A1 | * | 6/2014 | Evans | G06F 17/245 |
| | | | | 715/227 |

* cited by examiner

*Primary Examiner* — Hung Q Pham
(74) *Attorney, Agent, or Firm* — Shumaker & Sieffert, P.A.

(57) ABSTRACT

Techniques are described for modeling hierarchical information from a data source. In one example, a method for modeling hierarchical information from the data source includes outputting for display a plurality of columns that represent corresponding data sets in the data source and each comprise values from the corresponding data set. The method further includes receiving an input indicating a selected value from a first column that corresponds to a first data set in the data source, and the selected value is comprised in the first data set. The method further includes receiving an input indicating a second column that corresponds to a second data set from the data source. The method further includes outputting for display a filtered view of the second column that comprises a subset of values from the second data set that are associated in the data source with the selected value in the first data set.

18 Claims, 10 Drawing Sheets

| GeographyKey | CountryRegionName | StateCode | StateName | CCode | Population | TerritoryKey | City |
|---|---|---|---|---|---|---|---|
| 1 | Australia | NSW | New South Wales | AU | 22,328,800 | 9 | Alexandria |
| 2 | Australia | NSW | New South Wales | AU | 22,328,800 | 9 | Coffs Harbor |
| 3 | Australia | NSW | New South Wales | AU | 22,328,800 | 9 | Darlinghurst |
| 4 | Australia | NSW | New South Wales | AU | 22,328,800 | 9 | Goulburn |
| 5 | Australia | NSW | New South Wales | AU | 22,328,800 | 9 | Lane Cove |
| 6 | Australia | NSW | New South Wales | AU | 22,328,800 | 9 | Lavender Bay |

FIG. 3

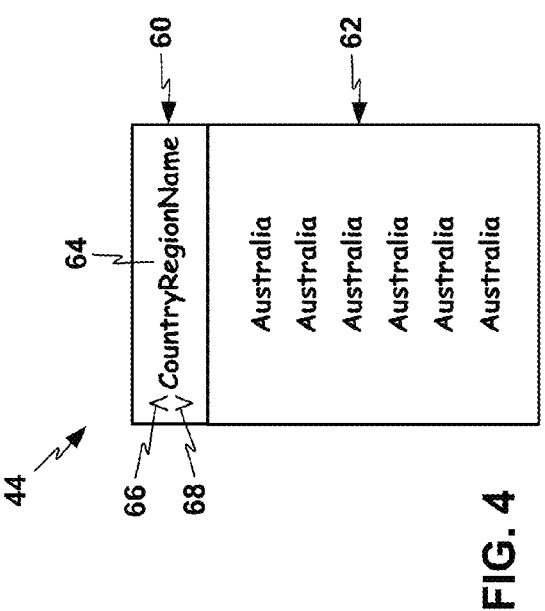

| CountryRegionName | |
|---|---|
| Australia | (10) |
| Canada | (15) |
| France | (30) |
| Germany | (24) |
| United Kingdom | (3) |
| United States | (90) |

176 → Australia   (10) ← 178

| CountryRegionName | |
|---|---|
| United Kingdom | (3) |
| Australia | (10) |
| Canada | (15) |
| Germany | (24) |
| France | (30) |
| United States | (90) |
| Distinct Count | (6) |

176 → Australia   (10) ← 178
186 → Distinct Count

FIG. 6

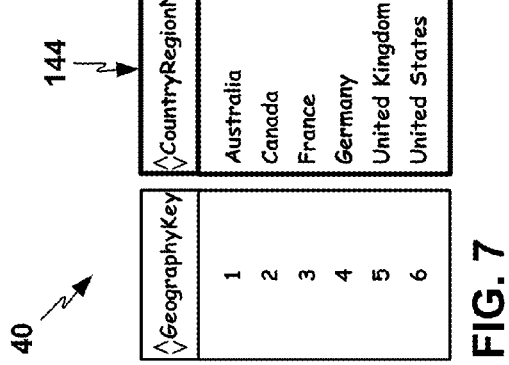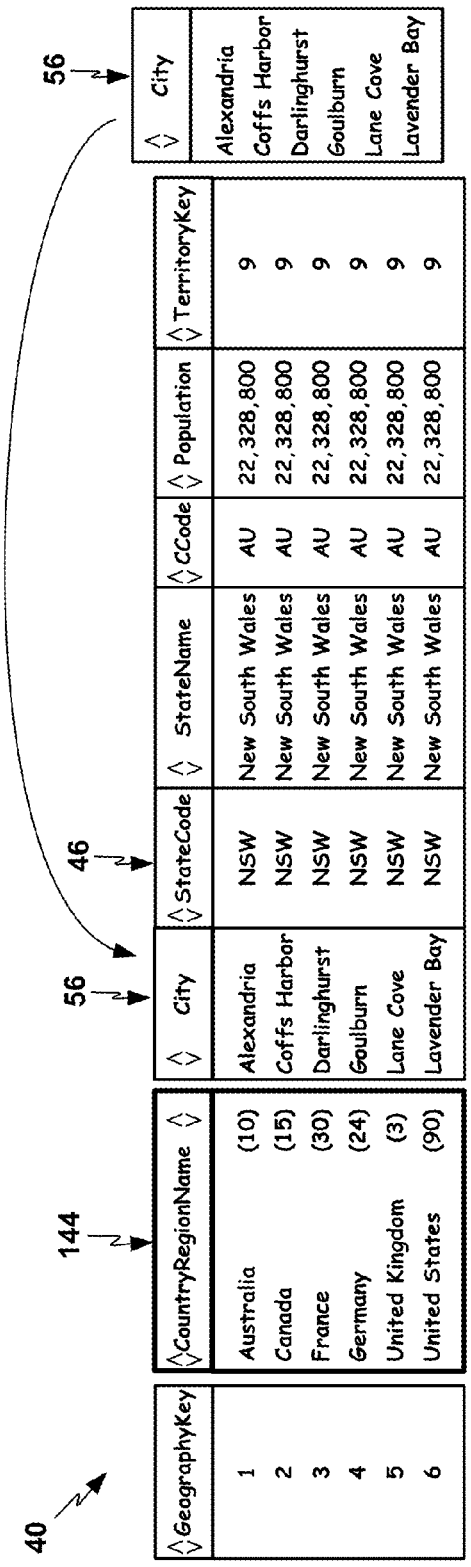
FIG. 7
FIG. 8

FIG. 11

| GeographyKey | CountryRegionName | | City | | StateCode | StateName | CCode | Population | TerritoryKey |
|---|---|---|---|---|---|---|---|---|---|
| 1 | Australia | (10) | Aurora | (5) | NSW | New South Wales | AU | 22,328,800 | 9 |
| 2 | Canada | (15) | Barrie | (1) | NSW | New South Wales | AU | 22,328,800 | 9 |
| 3 | France | (30) | Brampton | (1) | NSW | New South Wales | AU | 22,328,800 | 9 |
| 4 | Germany | (24) | Brossard | (1) | NSW | New South Wales | AU | 22,328,800 | 9 |
| 5 | United Kingdom | (3) | Burnaby | (2) | NSW | New South Wales | AU | 22,328,800 | 9 |
| 6 | United States | (90) | Calgary | (1) | | | | | |

FIG. 12

| GeographyKey | CountryRegionName | | StateCode | | City | StateName | CCode | Population | TerritoryKey |
|---|---|---|---|---|---|---|---|---|---|
| 1 | Australia | (10) | AB | (1) | Alexandria | New South Wales | AU | 22,328,800 | 9 |
| 2 | Canada | (15) | BC | (1) | Coffs Harbor | New South Wales | AU | 22,328,800 | 9 |
| 3 | France | (30) | MB | (1) | Darlinghurst | New South Wales | AU | 22,328,800 | 9 |
| 4 | Germany | (24) | NB | (1) | Goulburn | New South Wales | AU | 22,328,800 | 9 |
| 5 | United Kingdom | (3) | ON | (1) | Lane Cove | New South Wales | AU | 22,328,800 | 9 |
| 6 | United States | (90) | QC | (1) | Lavender Bay | New South Wales | AU | 22,328,800 | 9 |

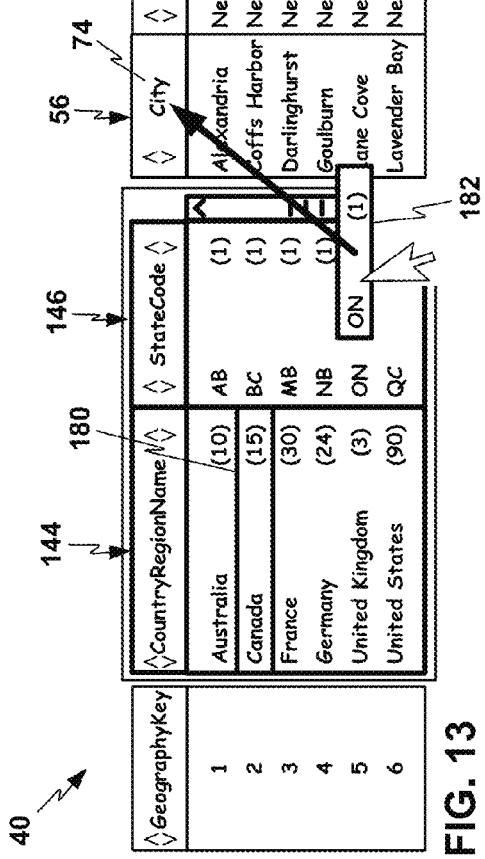
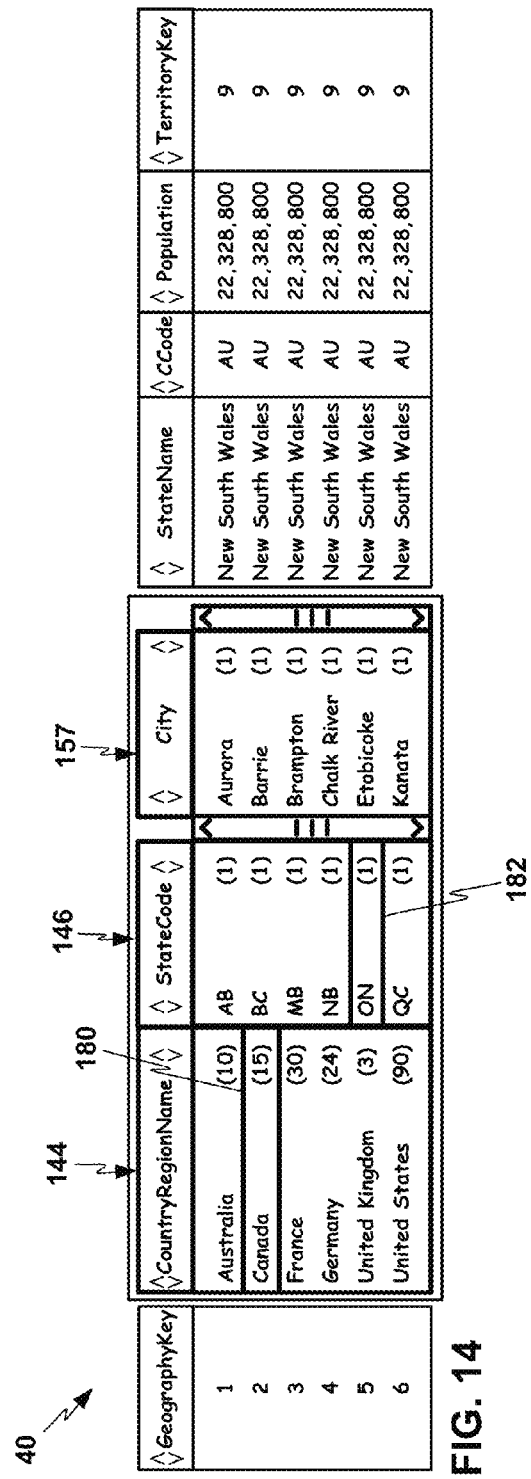
FIG. 13
FIG. 14

MODELING HIERARCHICAL INFORMATION FROM A DATA SOURCE

TECHNICAL FIELD

The invention relates to business intelligence systems, and more particularly, to modeling hierarchical information for business intelligence systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by many users. Using the results of these calculations, the system may generate reports for review by higher management. Often these complex systems make use of multidimensional data sources that organize and manipulate the tremendous volume of data using data structures referred to as data cubes. Each data cube, for example, includes a plurality of hierarchical dimensions having levels and members for storing the multidimensional data.

Business intelligence (BI) systems may be used to provide insights into such collections of enterprise data. In BI applications and other contexts, users often need to build models that define the structure of Online Analytical Processing (OLAP) data sources. A core part of the data modeling exercise is defining hierarchies from existing data. Trying to define a hierarchy may generally involve looking at a collection of data and trying to understand the relationships between the data. Many times, the relationships between the data are not obvious based on column names or even based on the data itself. Even if a user is familiar with the data, the user will still typically need to look at the data for reminders and clues of how the various data is related.

Some data modeling applications allow a user to view the data in a standard list format. This may be useful, at least for relatively small numbers of rows of data and not many repeating values. To deal with more complex cases, data modelers generally use a database querying tool to issue database queries (e.g., SQL queries) to filter, sort and count the data.

SUMMARY

In general, examples disclosed herein are directed to techniques for modeling hierarchical information from a data source. A hierarchical information modeling tool of this disclosure may enable a user to manipulate data models and run queries of the data within a single application and a single user interface (UI), among other advantages. A hierarchical information modeling tool of this disclosure may enable a data modeler to view data in a way that is optimal for spotting and verifying hierarchies in the data, and generally for exploring relationships in the data. A hierarchical information modeling tool of this disclosure may provide a unique way to visualize, order, group, filter, and count the data, among other advantages.

In one example, a method for modeling hierarchical information from a data source includes outputting for display, by a computing device, a plurality of columns, wherein each of the columns represents a corresponding data set in the data source, and each of the columns comprises one or more values from the corresponding data set. The method further includes receiving, by the computing device, an input indicating a selected value from the values in a first column from the plurality of columns, wherein the first column corresponds to a first data set from the data sets in the data source, and the selected value is comprised in the first data set. The method further includes receiving, by the computing device, an input indicating a second column from the plurality of columns, wherein the second column corresponds to a second data set from the data sets in the data source. The method further includes outputting for display, by the computing device, a filtered view of the second column that comprises a subset of values from the second data set that are associated in the data source with the selected value in the first data set.

In another example, a computer program product for modeling hierarchical information from a data source includes a computer-readable storage medium having program code embodied therewith. The program code is executable by a computing device to output, for display, a plurality of columns, wherein each of the columns represents a corresponding data set in the data source, and each of the columns comprises one or more values from the corresponding data set. The program code is further executable by a computing device to receive an input indicating a selected value from the values in a first column from the plurality of columns, wherein the first column corresponds to a first data set from the data sets in the data source, and the selected value is comprised in the first data set. The program code is further executable by a computing device to receive an input indicating a second column from the plurality of columns, wherein the second column corresponds to a second data set from the data sets in the data source. The program code is further executable by a computing device to output, for display, a filtered view of the second column that comprises a subset of values from the second data set that are associated in the data source with the selected value in the first data set.

In another example, a computer system for modeling hierarchical information from a data source includes one or more processors, one or more computer-readable memories, and one or more computer-readable, tangible storage devices. The computer system further includes program instructions, stored on at least one of the one or more storage devices for execution by at least one of the one or more processors via at least one of the one or more memories, to output, for display, a plurality of columns, wherein each of the columns represents a corresponding data set in the data source, and each of the columns comprises one or more values from the corresponding data set. The computer system further includes program instructions, stored on at least one of the one or more storage devices for execution by at least one of the one or more processors via at least one of the one or more memories, to receive an input indicating a selected value from the values in a first column from the plurality of columns, wherein the first column corresponds to a first data set from the data sets in the data source, and the selected value is comprised in the first data set. The computer system further includes program instructions, stored on at least one of the one or more storage devices for execution by at least one of the one or more processors via at least one of the one or more memories, to receive an input indicating a second column from the plurality of columns, wherein the second column corresponds to a second data set from the data sets in the data source. The computer system further includes program instructions, stored on at least one of the one or more storage devices for execution by at least one of the one or more processors via at least one of the one or more memories, to output, for display, a filtered view of the second column that comprises a subset of values from the second data set that are associated in the data source with the selected value in the first data set.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 3 shows an example of a data sampling bar as an illustrative user interface (UI) element of a hierarchical information modeling tool, in one example.

FIG. 4 shows various data columns included in a data sampling bar as particular illustrative UI elements provided by a hierarchical information modeling tool, in one example.

FIG. 5 shows a data column in a distinct value count view, in one example.

FIG. 6 shows a data column in a distinct value count view and including an overall distinct count footer, in one example.

FIG. 7 shows a data column detached from the other data columns of a data sampling bar, while the other data columns remain attached to each other within the data sampling bar, in one example FIG. 8 shows an example of a user operation to drag and drop a first data column next to a second data column to tether the second data column with the first data column, in one example

FIG. 11 shows a drag-and-drop user input to select a second column to position adjacent to and in a tethering relationship with a first column, in one example.

FIG. 12 shows a data sampling bar after a drag-and-drop user input to select a second column to position adjacent to and in a tethering relationship with a first column, in one example.

FIG. 13 shows a second column tethered to a first column, and a drag-and-drop user input to select a data value from the second column and to select a third column to filter by the selected value from the second column, in one example.

FIG. 14 shows a third column in a detached and filtered view with the data values of the third column filtered to show only those data values that correspond to both selected filter values from both first and second columns to which the third column is tethered, in one example

DETAILED DESCRIPTION

Figure 1:
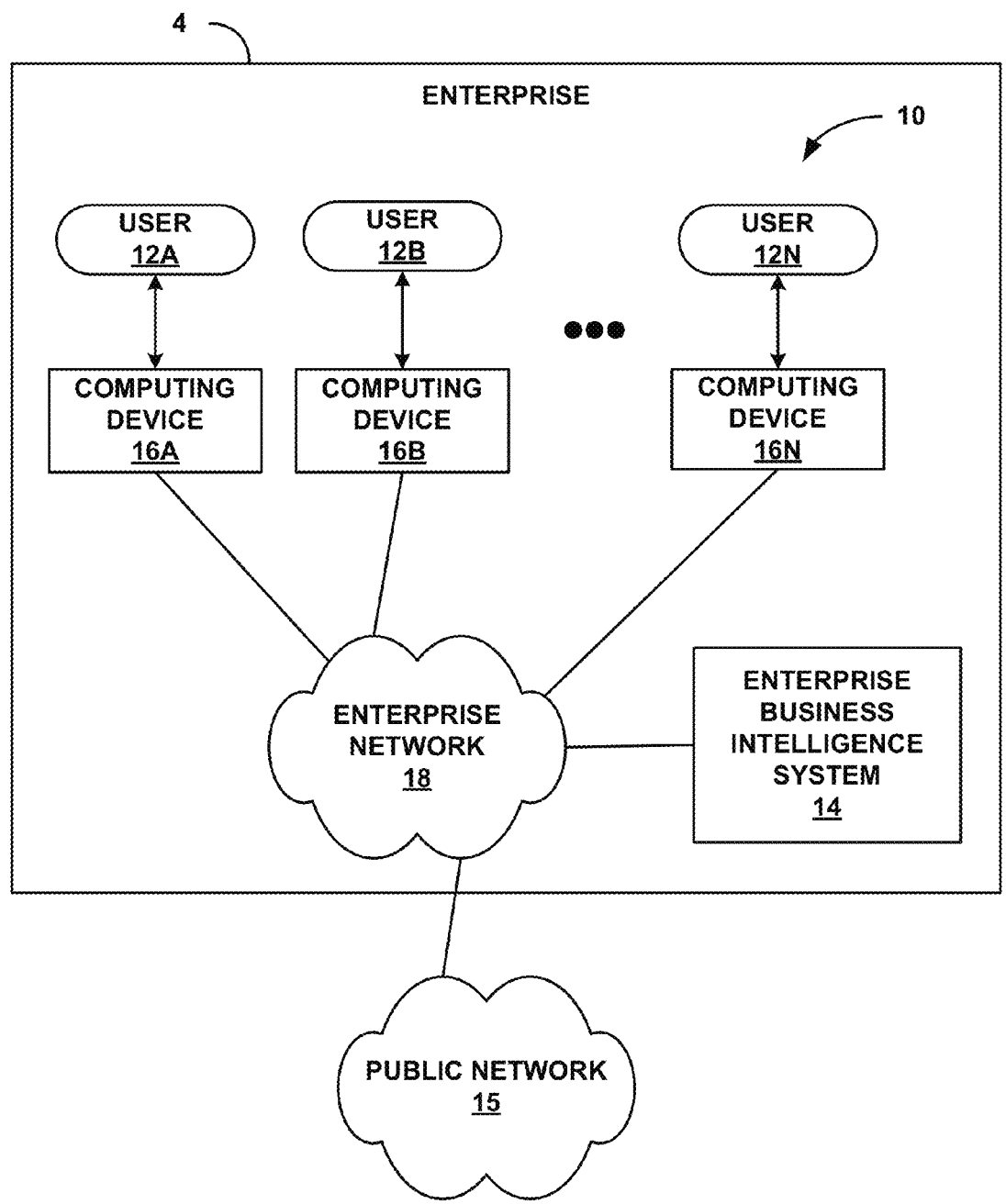
FIG. 1 is a block diagram illustrating an example enterprise having a computing environment in which users interact with an enterprise business intelligence system and data sources accessible over a public network.

Various examples are disclosed herein for modeling hierarchical information from a data source. FIG. 1 illustrates an example context in which a system of this disclosure may be used. FIG. 1 is a block diagram illustrating an example enterprise 4 having a computing environment 10 in which a plurality of users 12A-12N (collectively, "users 12") may interact with an enterprise business intelligence (BI) system 14. In the system shown in FIG. 1, enterprise business intelligence system 14 is communicatively coupled to a number of client computing devices 16A-16N (collectively, "client computing devices 16" or "computing devices 16") by an enterprise network 18. Users 12 interact with their respective computing devices to access enterprise business intelligence system 14. Users 12, computing devices 16A-16N, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

In this example, enterprise BI system 14 includes servers that run BI dashboard web applications and may provide business analytics software. A user 12 may use a BI portal on a client computing device 16 to view and manipulate information such as business intelligence reports ("BI reports") and other collections and visualizations of data via their respective computing devices 16. This may include data from any of a wide variety of sources, including from multidimensional data structures and relational databases within enterprise 4, as well as data from a variety of external sources that may be accessible over public network 15.

Users 12 may use a variety of different types of computing devices 16 to interact with enterprise business intelligence system 14 and access data visualization tools and other resources via enterprise network 18. For example, an enterprise user 12 may interact with enterprise business intelligence system 14 and run a business intelligence (BI) portal (e.g., a business intelligence dashboard, etc.) using a laptop computer, a desktop computer, or the like, which may run a web browser. Alternatively, an enterprise user may use a smartphone, tablet computer, or similar device, running a business intelligence dashboard in either a web browser or a dedicated mobile application for interacting with enterprise business intelligence system 14.

Enterprise network 18 and public network 15 may represent any communication network, and may include a packet-based digital network such as a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

Figure 2:
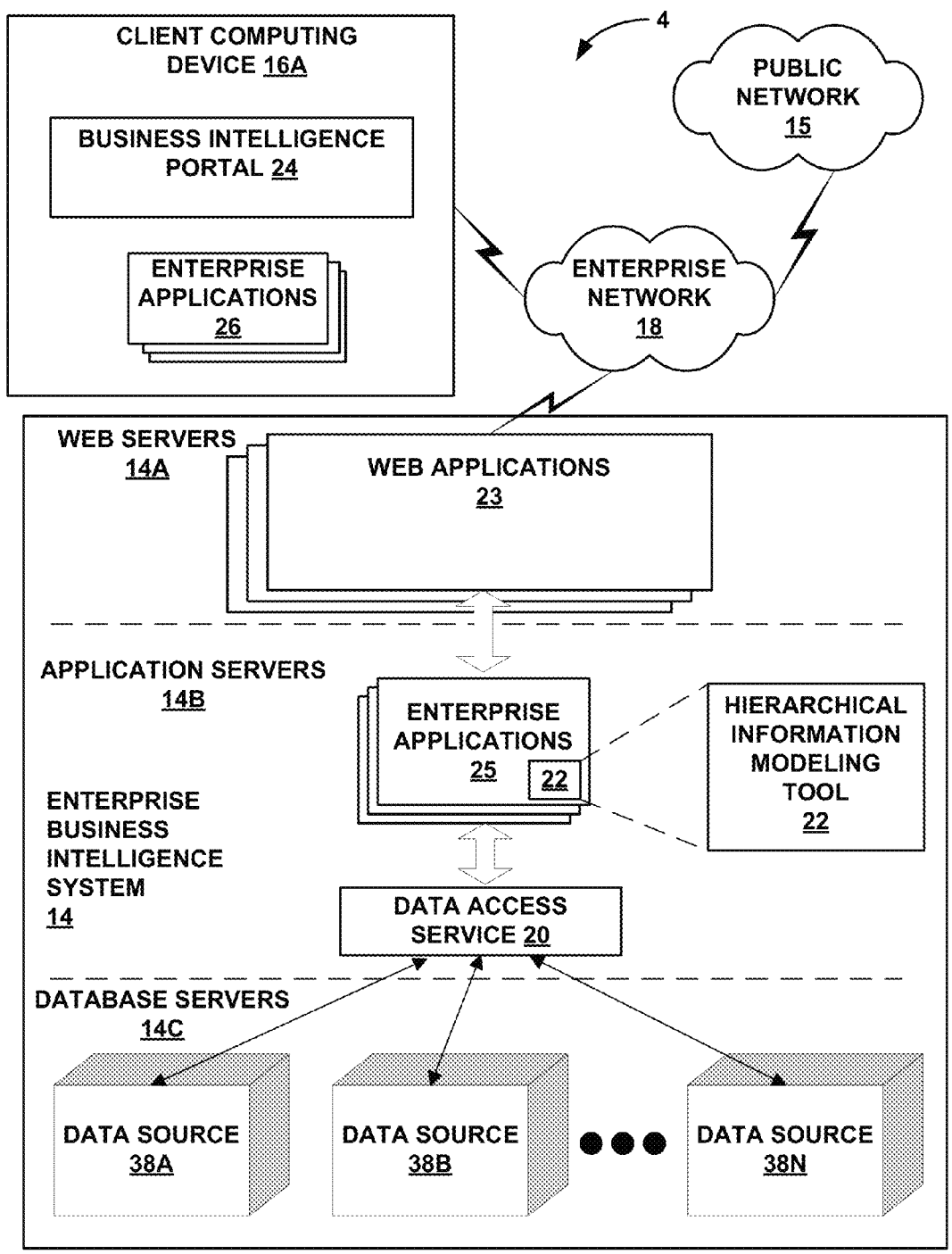
FIG. 2 is a block diagram illustrating one embodiment of an enterprise business intelligence computing environment including a system for modeling hierarchical information from a data source as part of a BI computing system.

FIG. 2 is a block diagram illustrating in further detail portions of one embodiment of an enterprise business intelligence (BI) system 14. In this example implementation, a single client computing device 16A is shown for purposes of example and includes a BI portal 24 and one or more client-side enterprise software applications 26 that may utilize and manipulate multidimensional data, including to view data visualizations and analytical tools with BI portal 24. BI portal 24 may be rendered within a general web browser application, within a locally hosted application or mobile application, or other user interface. BI portal 24 may be generated or rendered using any combination of application software and data local to the computing device it's being generated on, and/or remotely hosted in one or more application servers or other remote resources.

BI portal 24 may output data visualizations for a user to view and manipulate in accordance with various techniques described in further detail below. BI portal 24 may present data in the form of charts or graphs that a user may manipulate, for example. BI portal 24 may present visualizations of data based on data from sources such as a BI report, e.g., that may be generated with enterprise business intelligence system 14, or another BI dashboard, as well as other types of data sourced from external resources through public network 15. BI portal 24 may present visualizations of data based on data that may be sourced from within or external to the enterprise.

FIG. 2 depicts additional detail for enterprise business intelligence system 14 and how it may be accessed via interaction with a BI portal 24 for depicting and providing visualizations of business data. BI portal 24 may provide visualizations of data that represents, provides data from, or links to any of a variety of types of resource, such as a BI report, a software application, a database, a spreadsheet, a data structure, a flat file, Extensible Markup Language ("XML") data, a comma separated values (CSV) file, a data stream, unorganized text or data, or other type of file or resource. BI portal 24 may also display data record columns generated by a hierarchical information modeling tool 22.

Hierarchical information modeling tool 22 may be hosted among enterprise applications 25, as in the example depicted in FIG. 2, or may be hosted elsewhere, including on a client computing device 16A, or distributed among various computing resources in enterprise business intelligence system 14, in some examples. Hierarchical information modeling tool 22 may be implemented as or take the form of a stand-alone application, a portion or add-on of a larger application, a library of application code, a collection of multiple applications and/or portions of applications, or other forms, and may be executed by any one or more servers, client computing devices, processors or processing units, or other types of computing devices.

As depicted in FIG. 2, enterprise business intelligence system 14 is implemented in accordance with a three-tier architecture: (1) one or more web servers 14A that provide web applications 23 with user interface functions, including a server-side BI portal application 21; (2) one or more application servers 14B that provide an operating environment for enterprise software applications 25 and a data access service 20; and (3) database servers 14C that provide one or more data sources 38A, 38B, . . . , 38N ("data sources 38"). Enterprise software applications 25 may include geospatial element creation tool 22 as one of enterprise software applications 25 or as a portion or portions of one or more of enterprise software applications 25. The data sources 38 may include two-dimensional databases and/or multidimensional databases or data cubes. The data sources may be implemented using a variety of vendor platforms, and may be distributed throughout the enterprise. As one example, the data sources 38 may be multidimensional databases configured for Online Analytical Processing (OLAP). As another example, the data sources 38 may be multidimensional databases configured to receive and execute Multidimensional Expression (MDX) queries of some arbitrary level of complexity. As yet another example, the data sources 38 may be two-dimensional relational databases configured to receive and execute SQL queries, also with an arbitrary level of complexity. Data sources 38 may also include one or more sets of operational data 36 (e.g., business data or proprietary data) and one or more sets of geographical data 37 (e.g., public geographical data, custom business geographical data).

Multidimensional data structures are "multidimensional" in that each multidimensional data element is defined by a plurality of different object types, where each object is associated with a different dimension. The enterprise applications 26 on client computing device 16A may issue business queries to enterprise business intelligence system 14 to build reports. Enterprise business intelligence system 14 includes a data access service 20 that provides a logical interface to the data sources 38. Client computing device 16A may transmit query requests through enterprise network 18 to data access service 20. Data access service 20 may, for example, execute on the application servers intermediate to the enterprise software applications 25 and the underlying data sources in database servers 14C. Data access service 20 retrieves a query result set from the underlying data sources, in accordance with query specifications. Data access service 20 may intercept or receive queries, e.g., by way of an API presented to enterprise applications 26.

Data access service 20 may then return this result set to enterprise applications 26 as BI reports, other BI objects, and/or other sources of data that are made accessible to BI portal 24 on client computing device 16A. These may include data record columns generated by hierarchical information modeling tool 22. Hierarchical information modeling tool 22 may enable a user to manipulate data models and run queries of the data within a single application and a single user interface (UI), among other advantages, as further described below.

As noted above, in Business Intelligence (BI) applications and other contexts, users often need to build models that define the structure of OLAP data sources. A core part of the data modeling exercise is defining hierarchies from existing data. Trying to define a hierarchy may generally involve looking at a collection of data and trying to understand relationships among the data. Many times, relationships among the data are not obvious based on column names or even based on the data itself. Even if a user is familiar with the data, the user will still typically need to look at the data for reminders and clues of how the various data is related.

Some data modeling applications allow a user to view the data in a standard list format. While this is somewhat useful, it may not be very informative when there are many rows of data or many repeating values. To deal with more complex cases, data modelers generally resort to issuing database queries (e.g., SQL queries) to filter, sort and count the data. This requires the modeler usually to view the data in a separate application other than the modeling tool they are using to define the data hierarchies in. Using a separate tool may make it difficult to take the results of a set of queries and apply them directly to the data modeling tool.

Example embodiments of the present disclosure, such as hierarchical information modeling tool 22 depicted in FIG. 2, may enable both defining data hierarchies and visualizing data hierarchies for creating reports within a single tool. As described above and further below, hierarchical information modeling tool 22 may be implemented in one or more computing devices, and may involve one or more applications or other software modules that may be executed on one or more processors. Example embodiments of the present disclosure may illustratively be described in terms of the example of hierarchical information modeling tool 22 in various examples described below.

Hierarchical information modeling tool 22 may enable grouping and sorting data, including for summarizing measures and displaying charts, and additional sampling techniques. Hierarchical information modeling tool 22 may enable user interface (UI) elements such as a "data sampling widget" or "data sampling bar," e.g., a contiguous user interface element in which a plurality of columns are displayed contiguous to each other. Hierarchical information modeling tool 22 may enable a data modeler to view data in a way that facilitates spotting and verifying hierarchies in the data, and generally exploring relationships in the data. Hierarchical information modeling tool 22 may provide a unique way to visualize, order, group, filter, and count the data, among other advantages.

FIG. 3 shows an example of a data sampling bar 40 as an illustrative user interface (UI) element of a hierarchical information modeling tool, in one example. Data sampling bar 40 forms a contiguous user interface element in which the plurality of columns are displayed contiguous to each other, in this example. Each of the columns is displayed contiguously "attached" to one or two other columns on either side or on both sides, in this view. Various capabilities and properties of a hierarchical information modeling tool are discussed below in terms of capabilities and properties provided by data sampling bar 40 (or parts of data sampling bar 40, e.g., data column 44), that is, provided by a hierarchical information modeling tool via data sampling bar 40 (or parts thereof). FIG. 4 shows various data columns 42, 44, 46, 48, 50, 52, 54, 56 ("data columns 42-56") included in data sampling bar 40 as particular illustrative UI elements provided by a hierarchical information modeling tool, in one example.

Each of one or more of the data columns includes a column header and a list of data items. The various data columns 42-56 are aligned in a row view in data sampling bar 40 as shown in FIG. 3, such that each data item in each of the data columns is lined up in a row with corresponding data items in the other data columns. For example, the data items in each of the data columns 42-56 in FIG. 3 are lined up in rows of data items that correspond with the individual cities listed as the data items in data column 56. An individual one of data columns 42-56 may be manipulated in certain ways that detach the data column out of a row view correspondence with the other data columns and out of data sampling bar 40, as described below.

For example, data column 44 includes column header 60 and list 62 of data items or column values. In data column 44, as in each of one or more of the data columns in data sampling bar 40, column header 60 contains a column title 64 and a set of one or more action icons, such as action icons 66, 68. Data sampling bar 40 enables the data columns to be reordered through various means such as context menus or drag and drop. Data sampling bar 40 may thereby enable a data modeler to see how data compares side by side, e.g., with the data columns side by side. Data sampling bar 40 may also enable the data columns to be "detached" (or made discontiguous from the contiguous user interface element), and not only show rows of data, but distinct values of data, as further described below.

Data sampling bar 40 provides a set of capabilities to facilitate a user's understanding and visualizing of the column data, or of the data sets that correspond to each of the columns. For example, action icons 66, 68 enable sorting the column values by name in either ascending or descending order. As another example, columns may have repeating values as shown in FIG. 4, and data sampling bar 40 may enable an option to consolidate repeated values and only show each of the distinct values once in a consolidated view.

FIG. 5 shows data column 144, as data column 44 in a distinct value count view, in one example. Data column 144 in the distinct value count view may also be referred to as having a consolidated "show distinct values" mode enabled, or as a "consolidated distinct value view" or a "consolidated view". Data column 144 becomes detached from the overall list view of data sampling bar 40, reflecting that the rows in data column 144 no longer relate to the adjacent rows in the other data columns in data sampling bar 40. Data column 144 shows only one instance of each of the distinct data values along with the number of occurrences for each of the distinct values. For example, FIG. 5 shows a distinct value count indication 178 indicating that there are 10 instances of the distinct data value 176 for "Australia" in the full data record set. Each of the distinct value counts is an indication of a number of repetitions in the data records for each of the values. FIG. 5 may also include a footer showing an overall distinct count, as described below.

As the example in FIG. 5 shows, data column 144 includes six distinct column data values for the CountryRegionName column under column title 64, where the six distinct values for the CountryRegionName column are "Australia," "Canada," "France," "Germany," "United Kingdom," and "United States." Data column 144 may also enable sorting by either the distinct value counts or the names of each of the distinct values in the column. In many cases, there may be so many column values in a data column that the column values cannot all be displayed in the viewable area of a list, such that sorting by the column distinct count as enabled by data column 144 may be helpful. Data column 144 may enable sorting from highest to lowest or from lowest to highest distinct value counts (i.e., in descending or ascending order of distinct value counts). This may also be used to separate data column values with only a single instance in a column (i.e., distinct value count of 1) from data column values with multiple instances in a column (i.e., distinct value count greater than 1). A data modeler may thereby know to use data column values with only a single instance, or with a distinct value count of 1, as uniques, or unique values, for modeling the data.

FIG. 6 shows data column 184 in a distinct value count view and with an overall distinct count footer 186, in one example. Data column 184 is identical to data column 144 but which also includes an overall distinct count footer 186, and which reflects a sorting of the distinct column data values in ascending order from lowest to highest number of distinct value counts (i.e., from a lowest distinct value count of 3 for the "United Kingdom" column value, to a highest distinct value count of 90 for the "United States" column value). The overall distinct count provided by distinct count footer 186 tells the number of members (i.e., 6 in this example) for a specific level, and may be useful when modeling hierarchies of data. Data column 184 as shown in the example of FIG. 6 also shows that there are only six distinct values for the CountryRegionName data column, and that each of these six values repeats in the data set (anywhere from 3 to 90 times) and none of the distinct values for this data column are unique.

Data sampling bar 40 may enable a particular one of the data columns to be manipulated individually or independently, such as by enabling distinct value counts for the particular data column (e.g., data column 44/144/184 of FIGS. 3-6). Any data column from data sampling bar 40 may be individually selected for data manipulation from within the context of the entire data sampling bar 40 in a row view as in FIG. 3. When one of the data columns is selected for manipulation, data sampling bar 40 may "detach" that particular data column to indicate that the rows of data in that particular data column no longer align with the rows of data from the other columns in data sampling bar 40. FIG. 7 shows data column 144 detached from the other data columns of data sampling bar 40, while the other data columns remain attached to each other within data sampling bar 40, in one example. Data column 144 may facilitate visualizing unique column values (e.g., "Australia," "Canada," etc.) and their distinct value counts e.g., 10 for "Australia," 15 for "Canada," etc.).

Data sampling bar 40 enables various techniques to facilitate understanding the count statistics of each data column as well as understanding how the values of the various data columns are related to one another, both of which may be important for building meaningful data hierarchies as part of a data modeling process. For example, data sampling bar 40 may enable one or more additional data columns to be "tethered" together with a first data column or a selected data column, such that data manipulations (e.g., filtered view, distinct value count view, sorted view) that have been applied to the first data column or the selected data column may also be automatically applied to the one or more tethered data columns. A user may also apply data manipulations to one data column after that column has been tethered together with other data columns, and data sampling bar 40 may automatically apply or propagate those data manipulations to other tethered data columns.

Data sampling bar 40 may enable a drag and drop user action to initiate a tethering of one data column with another. FIG. 8 shows an example of a user operation to drag and drop data column 56, which includes names of individual cities as its data values, next to data column 144 to tether data column 56 with data column 144, in one example. Data column 56 is shown twice in FIG. 8 in positions before and after this drag and drop operation.

Figure 9:
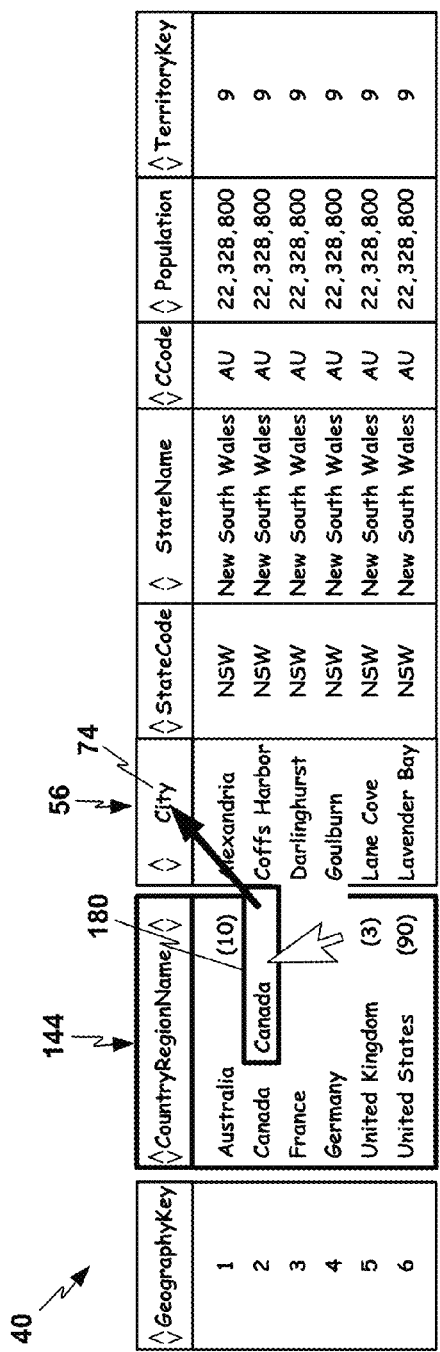
FIG. 9 shows user inputs selecting one of the data values from a first column and performing a drag-and-drop with the selected value onto the column title of a second column to select the second column to filter by the selected value from the first column, in one example.
Figure 10:
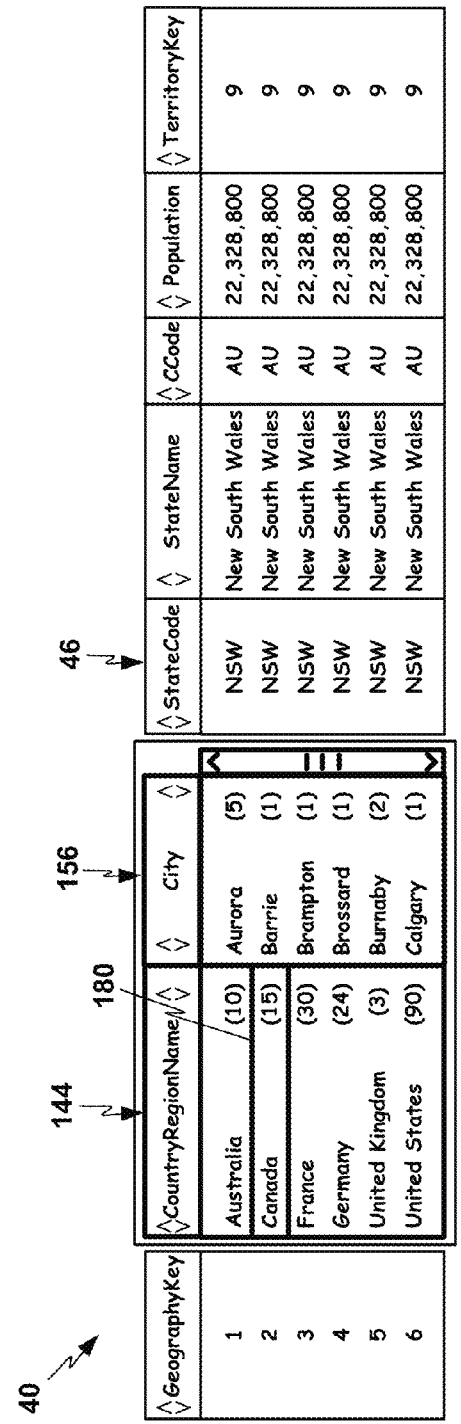
FIG. 10 shows a second column filtered by a selected data value from a first column, in one example.

Once the selected columns 144 and 56 are tethered beside each other, the user can select a value from a first one of the data columns to filter an adjoining data column among the tethered data columns. FIG. 9 shows a specific example of this. FIG. 9 shows user inputs selecting one of the data values (or cell values) from data column 144, e.g., the data value "Canada" at 180, and performing a drag-and-drop with the selected value "Canada" 180 onto the column title 74 of the City data column 56 to select City data column 56 to filter by the selected value "Canada" 180 from data column 144, in one example. Data sampling bar 40 may accept this operation as an input to filter the data values of the City column 56 by the CountryRegionName data value "Canada" from the CountryRegionName data column 144. Data sampling bar 40 may then filter the data values of the City column 56, which are names of cities, to filter out all of the data values other than names of cities in Canada. FIG. 10 shows City column 156 filtered by the data value "Canada" 180 from CountryRegionName data column 144, in one example. City column 156 is the same as City column 56 except with the filtering by the CountryRegionName data value "Canada" applied. With this filtering applied, data sampling bar 40 only shows values of the City data column 156 that correspond to the "Canada" data value 180 from the CountryRegionName data column 144 (i.e., names of cities in Canada, in this example).

FIG. 10 also shows that the consolidated distinct value view that has been applied to data column 144 is also automatically applied by data sampling bar 40 to data column 156. So, data column 156 does not show repeated instances of data values that occur multiple times in its data, as filtered by the selected filter value from the data column to which it is tethered (e.g., the "Canada" data value 180 from the CountryRegionName data column 144 in this example). Instead, data column 156 shows a single instance of each of its filtered data values along with distinct value counts indicating how many occurrences there are of each data value in the filtered data set. For example, in the example shown in FIG. 10, filtered City data column 156 as filtered by the value "Canada" shows distinct value counts of 5 for "Aurora" and 2 for "Barnaby," indicating that there are five instances of the value "Aurora" and two instances of the value "Burnaby" (e.g., for names of cities that occur in multiple provinces and/or territories in Canada). As also shown in FIG. 10, filtered City data column 156 as filtered by the value "Canada" shows distinct value counts of 1 for the other values depicted, indicating that there are only one instance each of the values "Barrie," "Brampton," "Brossard," and "Calgary" that correspond to the filter value "Canada."

FIG. 10 further shows a visual effect that data sampling bar 40 may automatically apply in the event of "tethering" the data columns 144 and 156 together. In this case, the cell value that is acting as the filter value (e.g., data value "Canada" at 180 in the example shown) may be highlighted, and the data column that is being filtered by the highlighted data value 180 (e.g., the City data column 156 in this example) may also be highlighted with the same highlighting color.

The column value counts displayed in a filtered data column are in the context of the column filter value. For example, the City data value "Aurora" repeats many times within the entire data set (e.g., corresponding to cities named "Aurora" in all countries included in the entire data set, in this example), but only repeats five times in the context of Canada. Thus, data sampling bar 40 may filter a data column to include a subset of identical instances of a data value (e.g., values for cities named "Aurora" in various provinces and/or territories in Canada, in this example) while excluding a subset of also identical instances of the same data value (e.g., values for cities named "Aurora" in various states and/or other sub-national divisions in other countries such as the United States, Australia, etc., in this example), based on correspondences of those data values with data values in other data columns.

Thus, by looking at the distinct value counts of the City column in FIG. 10, a data modeler can see that City values are not unique by CountryRegionName alone. This may serve as evidence that CountryRegionName column 144 and City column 156 are not hierarchically adjacent columns, i.e., that these two columns do not correspond to hierarchically adjacent data sets in the data source, for purposes of data modeling. Nevertheless, the fact that filtering City column 156 by CountryRegionName column 144 renders at least some of the values in City column 156 with a distinct value count of 1 may be evidence that these two columns have a hierarchically significant relationship, such as being hierarchically ordered with each other with one (or more) degrees of hierarchical separation, or with an additional hierarchically adjacent column that belongs between them. This is shown below, with StateProvinceCode column 46 found to belong in hierarchical order between CountryRegionName column 144 and City column 156, and hierarchically adjacent to both CountryRegionName column 144 and City column 156.

The data modeler may then perform another filtering operation on the City data column 156, an example of which is shown in FIGS. 11 and 12. FIG. 11 shows a drag-and-drop user input to select StateProvinceCode column 46 (the column title of which is depicted as "StateCode" in FIGS. 3 and 7-14) to position adjacent to and in a tethering relationship with CountryRegionName data column 144, in one example. FIG. 12 shows data sampling bar 40 after the drag-and-drop user input to select StateProvinceCode column 46 (now labeled 146) adjacent to and in a tethering relationship with CountryRegionName data column 144, in one example. StateProvinceCode column 146 as depicted in FIG. 12 is identical to StateProvinceCode column 46 as depicted in FIG. 11 except for having its data filtered by the selected data value "Canada" 180 in CountryRegionName data column 144, after data sampling bar 40 automatically filters StateProvinceCode column 46 by data value "Canada" 180.

StateProvinceCode column 46 prior to filtering, as depicted in FIG. 11, shows several repeated instances of the data value "NSW" (i.e., the state New South Wales in Australia, in this example), as a partial view of a small subset of all available data values, which may number in the hundreds or more, in this illustrative example. StateProvinceCode column 146 as depicted in FIG. 12, after filtering by the CountryRegionName data value "Canada," lists data values "AB," "BC," "MB," "NB," "ON," and "QC" as a partial view of data values in StateProvinceCode column 146 that correspond with the filter value "Canada" (e.g., abbreviations of the names of provinces (and potentially territories) in Canada, in this example). Data sampling bar 40 as shown in FIG. 12 also includes distinct value counts of 1 for each of the data values in the filtered StateProvinceCode column 146, indicating that each of the data values shown in the filtered data column is unique (reflecting that each province in Canada has a unique name).

The fact that each data value in the StateProvinceCode column 146 as filtered by the CountryRegionName data column 144 is unique is useful evidence that StateProvinceCode column 146 and CountryRegionName data column 144 are hierarchically adjacent columns in a data hierarchy, and that StateProvinceCode column 146 belongs in a child-parent relationship with CountryRegionName data column 144 as hierarchically adjacent data sets in a data hierarchy, for purposes of modeling the data at hand. Generally, a filtered column that shows a distinct value count of 1 in each of its rows, or for each of its distinct values, may be a useful indication that the filtered column and the column from which the filter value is selected are hierarchically adjacent columns, or that the two columns represent hierarchically adjacent data sets in a data hierarchy, for purposes of modeling the data at hand.

In other examples, a data modeler may filter a second data column by a selected value from a first data column, and data sampling bar 40 may show a filtered view of the second data column that show that several values each still have distinct values counts greater than one. In still other examples, a data modeler may filter a second data column by a selected value from a first data column, and data sampling bar 40 may show a filtered view of the second data column that is empty (i.e., shows no values) or that shows very few values. Either of these states may serve as useful indications to a data modeler on how or whether the two data columns may correspond to appropriate options as an adjacent pair of data levels in a modeled data hierarchy.

FIG. 12 also depicts City data column 56 reverted to its unfiltered state, as also shown in FIGS. 3 and 7. Data sampling bar 40 may automatically un-tether City data column 156 from its being tethered to CountryRegionName data column 144 when the user performs an operation to tether another data column (e.g., StateProvinceCode column 46) to a selected data column (e.g., StateProvinceCode column 46). Data sampling bar 40 may also automatically revert City data column 156 to its unfiltered state (shown at 56) and automatically reattach the un-tethered City data column 56 to the other data columns of data sampling bar 40.

Data sampling bar 40 may also tether more than two data columns together to show relationships among multiple columns. FIGS. 13 and 14 show data sampling bar 40 tethering multiple data columns together in response to user operations, in an illustrative example. FIG. 13 shows StateProvinceCode column 146 tethered to CountryRegionName data column 144 and a drag-and-drop user input to select a data value from StateProvinceCode column 146 and to select City column 56 to filter by the selected value from StateProvinceCode column 146, in one example. A user may select a data value 182 ("ON" in this example) from StateProvinceCode column 146 and drag and drop data value 182 to the column heading of another data column, e.g., header 74 of City data column 56. Data sampling bar 40 may then tether City data column 56 to StateProvinceCode column 146, and filter City data column 56 by data value "ON" 182, while StateProvinceCode column 146 is still also tethered to CountryRegionName data column 144, resulting in the view of FIG. 14. FIG. 14 shows the City data column (at 157) in a detached and filtered view with the data values of City column 157 filtered to show only those data values that correspond to both selected filter values 180 and 182, from both data columns to which City data column 157 is tethered, in one example (e.g., that each of the city names in Ontario is unique).

City data column 157 shows that each of its data values has a distinct value count of 1, i.e., that each of the data values in the doubly filtered City data column 157 is unique. The fact that each data value in the City data column 157 as filtered by the StateProvinceCode column 146 is unique is useful evidence that the City data column 157 belongs in a child-parent relationship with StateProvinceCode column 146 in a data hierarchy, for purposes of modeling the data at hand. Combined with the earlier information, data sampling bar 40 thereby implies that a hierarchy that includes CountryRegionName data column 144, StateProvinceCode column 146, and City data column 157 may be hierarchically adjacent columns, and therefore a reasonable choice for a data modeler to assign to three hierarchically adjacent tiers in a modeled data hierarchy.

Figure 15:
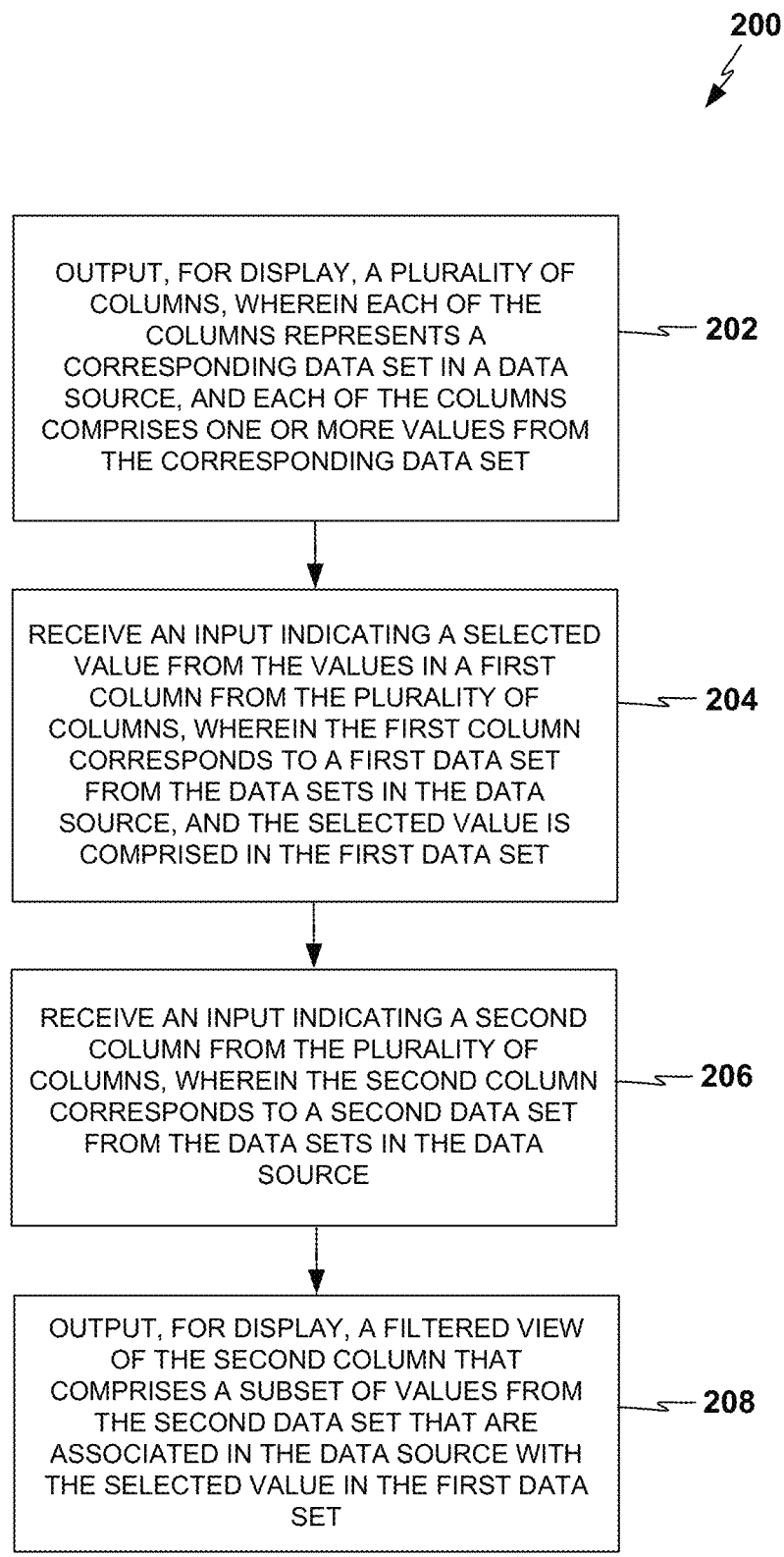
FIG. 15 depicts a process for modeling hierarchical information from a data source in a business intelligence (BI) system.

FIG. 15 shows a flowchart for an example overall process 200 that hierarchical information modeling tool 22, executing on one or more computing devices (e.g., servers, computers, processors, etc.), may perform. Operations performed by hierarchical information modeling tool 22 executing on a computing device may also be attributed as operations performed by a computing device.

As shown in FIG. 15, hierarchical information modeling tool 22 may output, for display, a plurality of columns, wherein each of the columns represents a corresponding data set in the data source, and each of the columns comprises one or more values from the corresponding data set (e.g., columns 42-56 in data sampling bar 40, and the values comprised in columns 42-56, as depicted in FIG. 3 et al.) (202). Hierarchical information modeling tool 22 may receive an input indicating a selected value from the values in a first column from the plurality of columns, wherein the first column corresponds to a first data set from the data sets in the data source, and the selected value is comprised in the first data set (e.g., the user input to select the value "Canada" 180 from CountryRegionName column 144 as shown in FIG. 9; or the user input to select the value "ON" 182 from StateRegionCode column 146 as shown in FIG. 13) (204).

Hierarchical information modeling tool 22 may also receive an input indicating a second column from the plurality of columns, wherein the second column corresponds to a second data set from the data sets in the data source (e.g., the user input to drag and drop the value "Canada" 180 from CountryRegionName column 144 to header 74 of City column 156 as shown in FIGS. 9 and 10; or the user input to drag and drop or otherwise reposition the StateRegionCode column 46 to be adjacent or "attached" to the CountryRegionName column 144, as shown in FIGS. 11 and 12; or the user input to drag and drop the value "ON" 182 from StateRegionCode column 146 to the header 74 of City column 156 as shown in FIGS. 13 and 14) (206). Hierarchical information modeling tool 22 may output, for display, a filtered view of the second column that comprises a subset of values from the second data set that are associated in the data source with the selected value in the first data set (e.g., the filtered view of City column 156 as filtered by the value "Canada" 180 from CountryRegionName column 144 as shown in FIG. 10; or the filtered view of StateRegionCode column 146 as filtered by the value "Canada" 180 from CountryRegionName column 144 as shown in FIG. 12; or the filtered view of City column 156 as filtered by the value "ON" 182 from StateRegionCode column 146 as shown in FIG. 14) (208).

Figure 16:
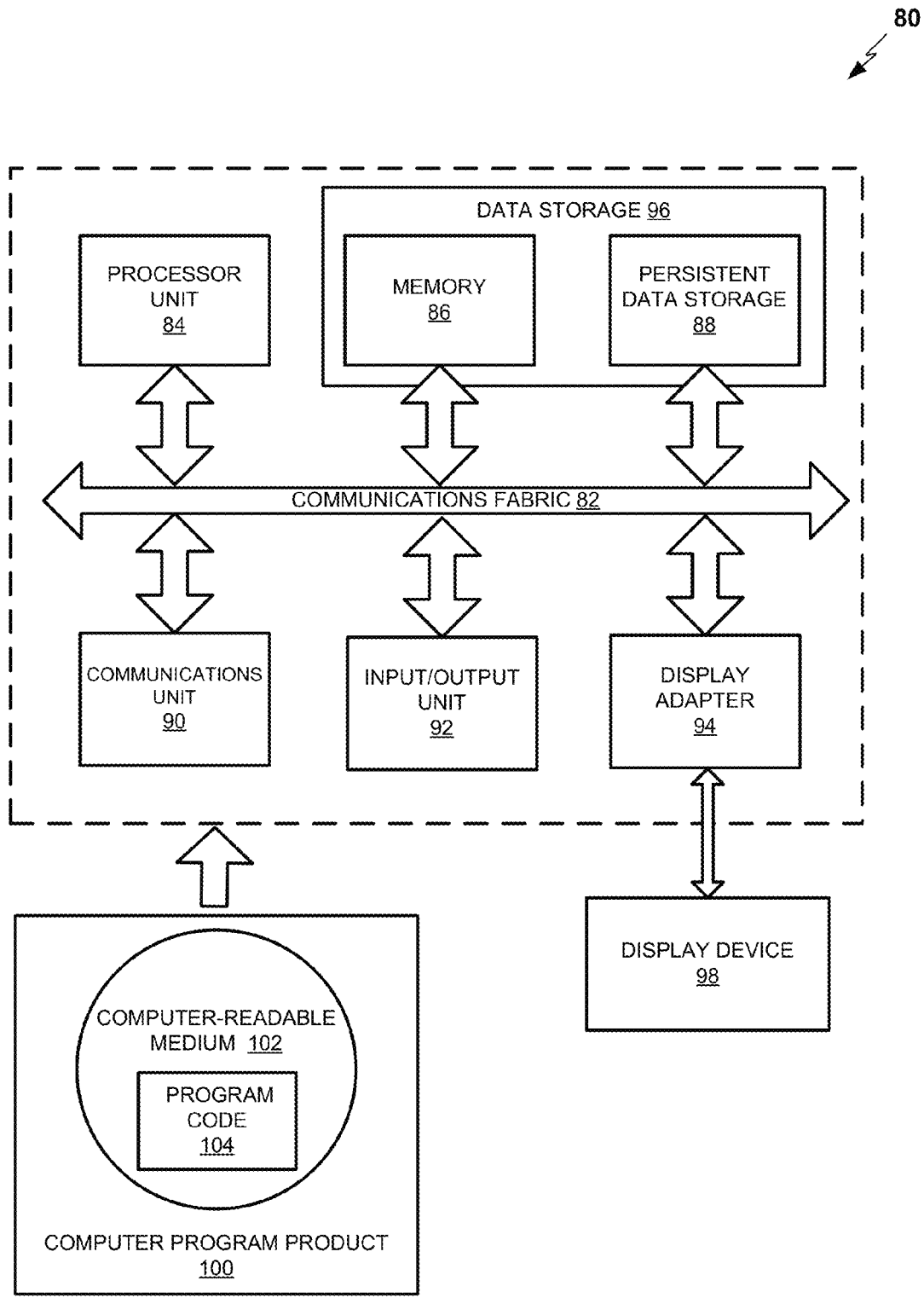
FIG. 16 is a block diagram of a computing device that may execute a system for modeling hierarchical information from a data source as part of a BI computing system.

FIG. 16 is a block diagram of a computing device 80 that may be used to execute a hierarchical information modeling tool 22, according to an illustrative example. Computing device 80 may be a server such as one of web servers 14A or application servers 14B as depicted in FIG. 2. Computing device 80 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 80 may include a computer having capabilities or formats other than or beyond those described herein.

In the illustrative example of FIG. 16, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a geospatial element creation tool 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorterrange direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

As will be appreciated by a person skilled in the art, aspects of the present disclosure may be embodied as a method, a device, a system, or a computer program product, for example. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer-readable data storage devices or computer-readable data storage components that include computer-readable medium(s) having computer readable program code embodied thereon. For example, a computer-readable data storage device may be embodied as a tangible device that may include a tangible data storage medium (which may be non-transitory in some examples), as well as a controller configured for receiving instructions from a resource such as a central processing unit (CPU) to retrieve information stored at one or more particular addresses in the tangible, non-transitory data storage medium, and for retrieving and providing the information stored at those particular one or more addresses in the data storage medium.

The data storage device may store information that encodes both instructions and data, for example, and may retrieve and communicate information encoding instructions and/or data to other resources such as a CPU, for example. The data storage device may take the form of a main memory component such as a hard disc drive or a flash drive in various embodiments, for example. The data storage device may also take the form of another memory component such as a RAM integrated circuit or a buffer or a local cache in any of a variety of forms, in various embodiments. This may include a cache integrated with a controller, a cache integrated with a graphics processing unit (GPU), a cache integrated with a system bus, a cache integrated with a multi-chip die, a cache integrated within a CPU, or the processor registers within a CPU, as various illustrative examples. The data storage apparatus or data storage system may also take a distributed form such as a redundant array of independent discs (RAID) system or a cloud-based data storage service, and still be considered to be a data storage component or data storage system as a part of or a component of an embodiment of a system of the present disclosure, in various embodiments.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, electro-optic, heat-assisted magnetic, or semiconductor system, apparatus, or device, or any suitable combination of the foregoing. A non-exhaustive list of additional specific examples of a computer readable storage medium includes the following: an electrical connection having one or more wires, a portable computer diskette, a hard disc, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device, for example.

Program code embodied on a computer readable medium may be transmitted using any appropriate medium, including but not limited to radio frequency (RF) or other wireless, wire line, optical fiber cable, etc., or any suitable combination of the foregoing. Computer program code for carrying out operations for aspects of the present invention may be written in any combination of one or more programming languages, including an object oriented programming language such as Java, Smalltalk, C++, or the like, or other imperative programming languages such as C, or functional languages such as Common Lisp, Haskell, or Clojure, or multi-paradigm languages such as C#, Python, or Ruby, among a variety of illustrative examples. One or more sets of applicable program code may execute partly or entirely on the user's desktop or laptop computer, smartphone, tablet, or other computing device; as a stand-alone software package, partly on the user's computing device and partly on a remote computing device; or entirely on one or more remote servers or other computing devices, among various examples. In the latter scenario, the remote computing device may be connected to the user's computing device through any type of network, including a local area network (LAN) or a wide area network (WAN), or the connection may be made to an external computer (for example, through a public network such as the Internet using an Internet Service Provider), and for which a virtual private network (VPN) may also optionally be used.

In various illustrative embodiments, various computer programs, software applications, modules, or other software elements may be executed in connection with one or more user interfaces being executed on a client computing device, that may also interact with one or more web server applications that may be running on one or more servers or other separate computing devices and may be executing or accessing other computer programs, software applications, modules, databases, data stores, or other software elements or data structures. A graphical user interface may be executed on a client computing device and may access applications from the one or more web server applications, for example. Various content within a browser or dedicated application graphical user interface may be rendered or executed in or in association with the web browser using any combination of any release version of HTML, CSS, JavaScript, XML, AJAX, JSON, and various other languages or technologies. Other content may be provided by computer programs, software applications, modules, or other elements executed on the one or more web servers and written in any programming language and/or using or accessing any computer programs, software elements, data structures, or technologies, in various illustrative embodiments.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Aspects of the present invention are described herein with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, may create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices, to produce a computer-implemented process such that the instructions that execute on the computer or other programmable apparatus provide or embody processes for implementing the functions or acts specified in the flowchart and/or block diagram block or blocks.

The flowchart and block diagrams in the figures illustrate the architecture, functionality, and operation of possible implementations of devices, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may be executed in a different order, or the functions in different blocks may be processed in different but parallel processing threads, depending upon the functionality involved. Each block of the block diagrams and/or flowchart illustration, and combinations of blocks in the block diagrams and/or flowchart illustration, may be implemented by special purpose hardware-based systems that perform the specified functions or acts, or combinations of executable instructions, special purpose hardware, and general-purpose processing hardware.

The description of the present disclosure has been presented for purposes of illustration and description, and is not intended to be exhaustive or limited to the disclosure in the form disclosed. Many modifications and variations will be understood by persons of ordinary skill in the art based on the concepts disclosed herein. The particular examples described were chosen and disclosed in order to explain the principles of the disclosure and example practical applications, and to enable others of ordinary skill in the art to understand the disclosure for various embodiments with various modifications as are suited to the particular use contemplated. The various examples described herein and other embodiments are within the scope of the following claims.

What is claimed is:

1. A method comprising:
   outputting for display, by one or more processors of a computing device, a plurality of columns, wherein each of the columns represents a corresponding data set from among data sets in the data source, and each of the columns comprises one or more values from the corresponding data set;
   receiving, by the one or more processors, an input to select a representation of a selected value from one or more values in a first column from the plurality of columns, wherein the first column corresponds to a first data set from the data sets in the data source, and the selected value comprises a data value comprised in the first data set;
   receiving, by the one or more processors, an input to drag the representation of the selected value from the first column onto the header of a second column from the plurality of columns, wherein the second column corresponds to a second data set from the data sets in the data source;
   receiving, by the one or more processors, an input to drop the representation of the selected value onto the header of the second column; and
   outputting for display, by the one or more processors, a filtered view of the second column that comprises a subset of only values from the second data set that are filtered by the selected value and are associated in the data source with the selected value in the first data set.

2. The method of claim 1, further comprising:
   receiving, by the one or more processors, an input to select a distinct value count view of the first column; and
   outputting for display, by the one or more processors, the distinct value count view of the first column, in which, for one or more distinct values in the first column, the one or more distinct values are displayed in the first column without repetition and with a number indicating how many times each of the distinct values in the first column occurs in the first data set.

3. The method of claim 2, further comprising:
   outputting for display, by the one or more processors, in response to the input to select the distinct value count view of the first column, a distinct value count view of the filtered view of the second column, in which, for one or more distinct values in the second column, the one or more distinct values are displayed in the second column without repetition and with a number indicating how many times each of the distinct values in the first column occurs in the second data set.

4. The method of claim 2, further comprising:
outputting for display, by the one or more processors, an icon representing a distinct value count sort option in a header of the first column; and
outputting for display, by the one or more processors, in response to an input selecting the distinct value count sort icon in the header of the first column, a sorted distinct value count view of the first column, in which the values in the distinct value count view of the first column are sorted in forward or reverse order by a number of the distinct value count of each of the distinct values in the distinct value count view of the first column.

5. The method of claim 2, further comprising:
outputting for display, by the one or more processors, an overall distinct count for the first column, in which the overall distinct count displays a sum of the distinct value counts for the one or more distinct values in the first column.

6. The method of claim 1, further comprising:
outputting for display, by the one or more processors, an icon representing a value sort option in a header of the first column; and
outputting for display, by the one or more processors, in response to an input selecting the value sort icon in the header of the first column, a sorted view of the first column, in which values in the first column are sorted in forward or reverse alphabetical order by value.

7. The method of claim 1, wherein the selected value is a first selected value, the method further comprising:
receiving, by the one or more processors, an input indicating a second selected value from the subset of values in the filtered view of the second column;
receiving, by the one or more processors, an input indicating a third column from the plurality of columns, wherein the third column corresponds to a third data set from the data sets in the data source; and
outputting for display, by the one or more processors, a filtered view of the third column that comprises a subset of values from the third data set that are associated in the data source with the second selected value in the second data set.

8. The method of claim 1, further comprising:
receiving, by the one or more processors, an input to reposition the second column adjacent to the first column; and
outputting for display, by the one or more processors, the second column repositioned to adjacent to the first column.

9. The method of claim 1, further comprising:
outputting for display, by the one or more processors, the plurality of columns in a contiguous user interface element in which the plurality of columns are displayed contiguous to each other; and
wherein outputting for display the filtered view of the second column comprises outputting the second column in a detached view in which the second column is discontiguous from the contiguous user interface element.

10. The method of claim 9, further comprising:
receiving, by the one or more processors, an input to select and move a third column; and
outputting for display, by the computing device, the third column in a new position in the contiguous user interface element as indicated by the input to select and move the third column.

11. A computer program product comprising a computer-readable storage medium having program code embodied therewith, the program code executable by a computing device to:
output, for display, a plurality of columns, wherein each of the columns represents a corresponding data set from among data sets in the data source, and each of the columns comprises one or more values from the corresponding data set;
receive an input to select a representation of a selected value from one or more values in a first column from the plurality of columns, wherein the first column corresponds to a first data set from the data sets in the data source, and the selected value comprises a data value comprised in the first data set
receive an input to drag the representation of the selected value from the first column onto the header of a second column from the plurality of columns, wherein the second column corresponds to a second data set from the data sets in the data source;
receive an input to drop the representation of the selected value onto the header of the second column; and
output, for display, a filtered view of the second column that comprises a subset of only values from the second data set that are filtered by the selected value and are associated in the data source with the selected value in the first data set.

12. The computer program product of claim 11, wherein the program code is further executable by a to:
receive an input to select a distinct value count view of the first column; and
output, for display, the distinct value count view of the first column, in which, for one or more distinct values in the first column, the one or more distinct values are displayed in the first column without repetition and with a number indicating how many times each of the distinct values in the first column occurs in the first data set.

13. The computer program product of claim 12, wherein the program code is further executable by a to:
output, for display, in response to the input to select the distinct value count view of the first column, a distinct value count view of the filtered view of the second column, in which, for one or more distinct values in the second column, the one or more distinct values are displayed in the second column without repetition and with a number indicating how many times each of the distinct values in the first column occurs in the second data set.

14. The computer program product of claim 11, wherein the program code is further executable by a to:
receive an input indicating a second selected value from the subset of values in the filtered view of the second column;
receive an input indicating a third column from the plurality of columns, wherein the third column corresponds to a third data set from the data sets in the data source; and
output, for display, a filtered view of the third column that comprises a subset of values from the third data set that are associated in the data source with the selected value in the second data set.

15. A computer system comprising:
one or more processors, one or more computer-readable memories, and one or more computer-readable, tangible storage devices;

program instructions, stored on at least one of the one or more storage devices for execution by at least one of the one or more processors via at least one of the one or more memories, to output, for display, a plurality of columns, wherein each of the columns represents a corresponding data set from among data sets in the data source, and each of the columns comprises one or more values from the corresponding data set;

program instructions, stored on at least one of the one or more storage devices for execution by at least one of the one or more processors via at least one of the one or more memories, to receive an input to select a representation of a selected value from one or more values in a first column from the plurality of columns, wherein the first column corresponds to a first data set from the data sets in the data source, and the selected value comprises a data value comprised in the first data set;

program instructions, stored on at least one of the one or more storage devices for execution by at least one of the one or more processors via at least one of the one or more memories, to receive an input to drag the representation of the selected value from the first column onto the header of a second column from the plurality of columns, wherein the second column corresponds to a second data set from the data sets in the data source;

program instructions, stored on at least one of the one or more storage devices for execution by at least one of the one or more processors via at least one of the one or more memories, to receive an input to drop the representation of the selected value onto the header of the second column; and program instructions, stored on at least one of the one or more storage devices for execution by at least one of the one or more processors via at least one of the one or more memories, to output, for display, a filtered view of the second column that comprises a subset of only values from the second data set that are filtered by the selected value and are associated in the data source with the selected value in the first data set.

16. The computer system of claim 15, further comprising:
program instructions, stored on at least one of the one or more storage devices for execution by at least one of the one or more processors via at least one of the one or more memories, to receive an input to select a distinct value count view of the first column; and program instructions, stored on at least one of the one or more storage devices for execution by at least one of the one or more processors via at least one of the one or more memories, to output, for display, the distinct value count view of the first column, in which, for one or more distinct values in the first column, the one or more distinct values are displayed in the first column without repetition and with a number indicating how many times each of the distinct values in the first column occurs in the first data set.

17. The computer system of claim 16, further comprising:
program instructions, stored on at least one of the one or more storage devices for execution by at least one of the one or more processors via at least one of the one or more memories, to output, for display, in response to the input to select the distinct value count view of the first column, a distinct value count view of the filtered view of the second column, in which, for one or more distinct values in the second column, the one or more distinct values are displayed in the second column without repetition and with a number indicating how many times each of the distinct values in the first column occurs in the second data set.

18. The computer system of claim 15, further comprising:
program instructions, stored on at least one of the one or more storage devices for execution by at least one of the one or more processors via at least one of the one or more memories, to receive an input indicating a second selected value from the subset of values in the filtered view of the second column;

program instructions, stored on at least one of the one or more storage devices for execution by at least one of the one or more processors via at least one of the one or more memories, to receive an input indicating a third column from the plurality of columns, wherein the third column corresponds to a third data set from the data sets in the data source; and program instructions, stored on at least one of the one or more storage devices for execution by at least one of the one or more processors via at least one of the one or more memories, to output, for display, a filtered view of the third column that comprises a subset of values from the third data set that are associated in the data source with the selected value in the second data set.

* * * * *